(12) United States Patent
Zheng et al.

(10) Patent No.: US 11,689,143 B2
(45) Date of Patent: Jun. 27, 2023

(54) ELECTRIC MOTOR CONTROL METHOD AND DEVICE, SYSTEM, AND ELECTRIC VEHICLE

(71) Applicant: CONTEMPORARY AMPEREX TECHNOLOGY CO., LIMITED, Ningde (CN)

(72) Inventors: Xiong Zheng, Ningde (CN); Xianxi Pan, Ningde (CN); Zhimin Dan, Ningde (CN); Hong Wang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 17/858,862

(22) Filed: Jul. 6, 2022

(65) Prior Publication Data
US 2023/0064607 A1 Mar. 2, 2023

Related U.S. Application Data

(63) Continuation of application No. PCT/CN2021/114600, filed on Aug. 25, 2021.

(51) Int. Cl.
*H02P 27/08* (2006.01)
*H02M 7/5395* (2006.01)

(52) U.S. Cl.
CPC .......... *H02P 27/08* (2013.01); *H02M 7/5395* (2013.01); *H02K 2213/03* (2013.01)

(58) Field of Classification Search
CPC ...... H02P 21/00; H02P 21/0003; H02P 21/02; H02P 21/14; H02P 21/20; H02P 21/22;
(Continued)

(56) References Cited

U.S. PATENT DOCUMENTS 11,025,157 B2 * 6/2021 Minesawa ................ G01K 7/00

FOREIGN PATENT DOCUMENTS

| CN | 1926757 A | 3/2007 |
| CN | 108736782 A | 11/2018 |

(Continued)

OTHER PUBLICATIONS

Contemporary Amperex Technology Co., Limited, International Search Report and Written Opinion, PCT/CN2021/114600, dated Mar. 29, 2022, 14 pgs.

*Primary Examiner* — Antony M Paul
(74) *Attorney, Agent, or Firm* — Morgan, Lewis & Bockius LLP (57) ABSTRACT

This application provides an electric motor control method and device, a system, and an electric vehicle. The method includes: obtaining an input power and an output power of an electric motor; calculating a loss power based on the input power and the output power; determining a target d-axis current of the electric motor, where the target d-axis current is calculated by a calculation module based on the loss power, the calculation module includes a tracking differentiator, and the calculation module operates in a controller; and determining a duty ratio based on the target d-axis current and a preset q-axis current, and inputting the duty ratio into an inverter so that the inverter drives, based on the duty ratio, the electric motor to operate.

15 Claims, 7 Drawing Sheets

(58) Field of Classification Search
CPC .......... H02P 21/26; H02P 21/28; H02P 21/30;
H02P 23/00; H02P 23/07; H02P 23/14;
H02P 27/00; H02P 27/04; H02P 27/06;
H02P 27/08; H02P 29/00; H02P 29/40;
H02P 2207/05; H02P 2205/03; H02P
6/00; H02P 6/04; H02P 6/08; H02P 6/28;
H02P 6/32; H02P 1/00; H02P 1/24; H02P
1/26; H02P 1/42; H02P 1/46
See application file for complete search history.

(56) References Cited

FOREIGN PATENT DOCUMENTS

| | | |
|---|---|---|
| CN | 112928969 A | 6/2021 |
| JP | 2000116198 A | 4/2000 |
| JP | 2008236948 A | 10/2008 |

\* cited by examiner

ELECTRIC MOTOR CONTROL METHOD AND DEVICE, SYSTEM, AND ELECTRIC VEHICLE

CROSS-REFERENCE TO RELATED APPLICATION

This application is a continuation application of PCT Patent Application No. PCT/CN2021/114600, entitled "ELECTRIC MOTOR CONTROL METHOD, DEVICE, SYSTEM AND ELECTRIC VEHICLE" filed on Aug. 25, 2021, which is incorporated herein by reference in its entirety.

TECHNICAL FIELD

This application relates to the technical field of electric motor driving and control, and in particular, to an electric motor control method and device, a system, and an electric vehicle.

BACKGROUND

Electric motors come in many types, and may be classified into a direct-current motor, an asynchronous motor, and a synchronous motor depending on the structure and the working principles. A permanent-magnet synchronous motor is widely used in a drive system of a new energy vehicle by virtue of advantages such as high efficiency, a high power factor, and a high power density. However, under conditions of limited volume and capacity of a battery, a control algorithm needs to seek improvement of overall efficiency of the drive system while ensuring excellent control performance.

An efficiency optimization control algorithm is to enhance efficiency by reasonably adjusting variables such as voltage, current, and flux linkage of an electric motor in operation when the electric motor meets operation conditions. Currently, efficiency optimization control algorithms may be basically classified into a loss model algorithm and a search algorithm depending on technical principles. The search algorithm is to adjust control variables such as current and flux linkage to minimize an input power on condition that an output power of the electric motor is constant. This algorithm is robust to changes of electric motor parameters. However, this algorithm involves a large amount of computing, and takes a long time to optimize the efficiency of the permanent-magnet synchronous motor. The loss model algorithm is to build a loss model based on the parameters of the electric motor itself, and then determine an optimal value of the model to achieve the purpose of efficiency optimization. This algorithm possesses good convergence properties, responds quickly, and achieves good dynamic performance, but the optimization effect of this algorithm depends greatly on the parameters of the electric motor itself.

SUMMARY

An objective of embodiments of this application is to provide an electric motor control method and device, a system, and an electric vehicle to solve such problems in the prior art as a long time consumed and great dependence of optimization effects on the parameters of the electric motor.

According to a first aspect, an embodiment of this application provides an electric motor control method, including: obtaining an input power and an output power of an electric motor; determining a loss power based on the input power and the output power; determining a target d-axis current of the electric motor, where the target d-axis current is calculated by a calculation module based on the loss power, the calculation module includes a tracking differentiator, and the calculation module operates in a controller; and determining a duty ratio based on the target d-axis current and a preset q-axis current, and inputting the duty ratio into an inverter so that the inverter drives, based on the duty ratio, the electric motor to operate.

In this embodiment of this application, the loss power of the electric motor is input into the tracking differentiator. The tracking differentiator can obtain the target d-axis current quickly, thereby greatly reducing the dependence on parameters of the electric motor and reducing the amount of computing.

In any embodiment, the obtaining an input power and an output power of an electric motor includes: obtaining an input voltage and an input current of the electric motor, and obtaining the input power based on the input voltage and the input current; and obtaining an output torque and an output rotation speed of the electric motor, and obtaining the output power based on the output torque and the output rotation speed.

In this embodiment of this application, the input power and the output power are calculated, and then a difference between the input power and the output power is calculated to obtain the loss power, thereby obtaining an accurate loss power on the one hand and reducing the dependence on internal parameters of the electric motor on the other hand.

In any embodiment, the calculating a loss power based on the input power and the output power includes: using a difference between the output power and the input power as the loss power. In this embodiment of this application, the difference between the input power and the output power is calculated to obtain the loss power, thereby obtaining an accurate loss power on the one hand and reducing the dependence on internal parameters of the electric motor on the other hand.

In any embodiment, the determining a duty ratio based on the target d-axis current and a preset q-axis current includes:

comparing the target d-axis current with a current d-axis current in the inverter, and comparing the preset q-axis current with a current q-axis current in the inverter, and determining the duty ratio based on the target d-axis current and the preset q-axis current if a deviation between the target d-axis current and the current d-axis current is greater than a first preset threshold and/or a deviation between the preset q-axis current and the current q-axis current is greater than a second preset threshold. When the change in the target d-axis current is small, the duty ratio is not calculated again, but the previous duty ratio is fed into the inverter, thereby reducing the amount of computing of the controller.

In any embodiment, the method further includes: constructing the tracking differentiator based on a second-order transfer function, where the tracking differentiator includes one input end and two output ends, a first output end is configured to track dynamic characteristics of the input loss power, and a second output end is configured to differentiate a signal output by the first output end.

In any embodiment, the tracking differentiator is:

$$\begin{cases} x_1(k+1) = x_1(k) + hx_2(k) \\ x_2(k+1) = x_2(k) + h(-r^2(x_1(k) - v_0(k)) - 2rx_2(k)) \end{cases}.$$

In the formula above, $v_0(k)$ is an input to the tracking differentiator, and is a loss power corresponding to a kth moment; $x_1(k+1)$ is a first output from the tracking differentiator at a (k+1)th moment, and is used to track dynamic characteristics of the loss power at the kth moment; $x_2(k+1)$ is a second output from the tracking differentiator at a (k+1)th moment, and is used to differentiate the first output; r is a speed factor; and h is a filter factor.

In this embodiment of this application, the loss power of the permanent-magnet synchronous motor is input into the tracking differentiator. The tracking differentiator can obtain the target d-axis current quickly, thereby greatly reducing the dependence on parameters of the electric motor and reducing the amount of computing.

According to a second aspect, an embodiment of this application provides an electric motor control device. The control device operates in a controller, and includes: a power calculation module, configured to obtain an input power and an output power of an electric motor, and calculates a loss power based on the input power and the output power; a current tracking module, configured to determine a target d-axis current of the electric motor, where the target d-axis current is calculated by a calculation module based on the loss power, the calculation module includes a tracking differentiator, and the calculation module operates in a controller; and an efficiency optimization module, configured to determine a duty ratio based on the target d-axis current and a preset q-axis current, and input the duty ratio into an inverter so that the inverter drives, based on the duty ratio, the electric motor to operate.

According to a third aspect, an embodiment of this application provides a non-transitory computer-readable storage medium. The non-transitory computer-readable storage medium stores a computer instruction, and the computer instruction causes a computer to perform the method according to the first aspect.

According to a fourth aspect, an embodiment of this application provides an electric motor drive system of an electric vehicle. The electric motor drive system includes the control device according to the second aspect.

According to a fifth aspect, an embodiment of this application provides an electric vehicle, including the electric motor drive system according to the fourth aspect.

Other features and advantages of this application are expounded in the following specification and partly become evident from the specification, or will be understood by implementing an embodiment of this application. The objectives and other advantages of this application can be implemented and achieved through the structures specified in the specification, the claims, and the drawings.

BRIEF DESCRIPTION OF DRAWINGS

To describe technical solutions in embodiments of this application more clearly, the following outlines the drawings to be used in the embodiments of this application. Understandably, the following drawings show merely some embodiments of this application, and therefore, are not intended to limit the scope. A person of ordinary skill in the art may derive other related drawings from the drawings without making any creative efforts.

DETAILED DESCRIPTION OF EMBODIMENTS

For ease of description, the embodiments of this application are described by using a permanent-magnet synchronous motor as an example. Understandably, the embodiments of this application are also applicable to induction motors and the like. The specific types of electric motors are not limited in the embodiments of this application.

A method for calculating a loss power of a permanent-magnet synchronous motor using a conventional loss model algorithm is described below.

Figure 1A:
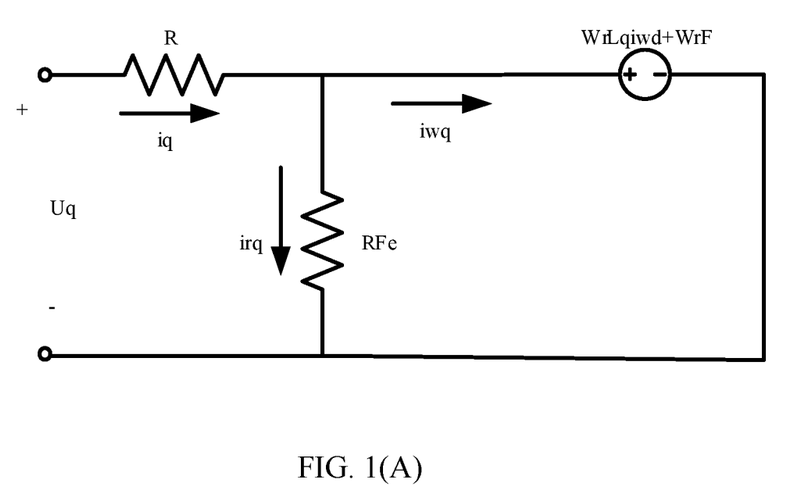
FIG. 1(A) is a q-axis equivalent circuit diagram allowing for an iron loss according to an embodiment of this application.
Figure 1B:
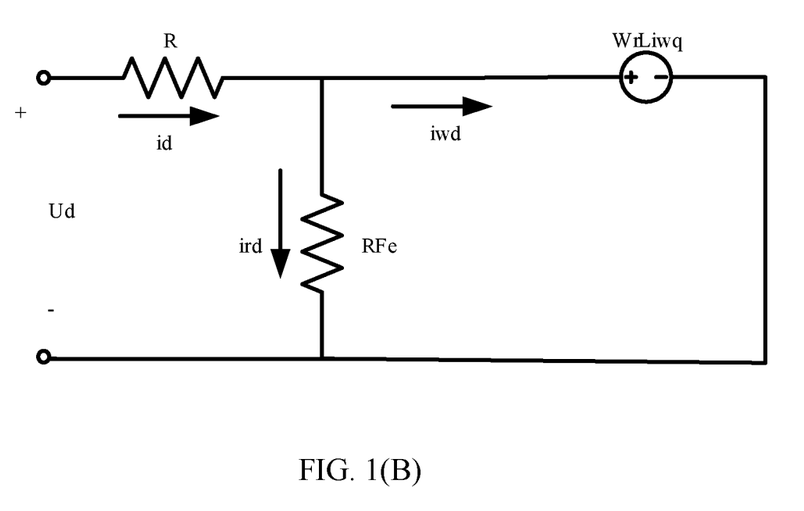
FIG. 1(B) is a d-axis equivalent circuit diagram allowing for an iron loss according to an embodiment of this application.

FIG. 1(A) is a q-axis equivalent circuit diagram allowing for an iron loss according to an embodiment of this application, and FIG. 1(B) is a d-axis equivalent circuit diagram allowing for an iron loss according to an embodiment of this application.

In a synchronous rotating coordinate system, a d-q axis voltage equation of the permanent-magnet synchronous motor is shown in Formula (1):

$$\begin{cases} U_d = Ri_{wd} + p\psi_d - W_r\psi_q \\ U_q = Ri_{wq} + p\psi_q - W_r\psi_d \end{cases} \quad (1)$$

When the permanent-magnet synchronous motor is in a steady state, Formula (2) can be obtained based on Kirchhoff's law:

$$\begin{cases} U_d = Ri_{wd} + U_{wd} + \dfrac{RU_{wd}}{R_{Fe}} \\ U_q = Ri_{wq} + U_{wq} + \dfrac{RU_{wq}}{R_{Fe}} \end{cases} \quad (2)$$

From Formula (2), Formula (3) can be derived:

$$\begin{cases} i_{wd} = i_d - i_{rd} \\ i_{wq} = i_q - i_{rq} \end{cases} \quad (3)$$

A conventional method for calculating a controllable electrical loss of a permanent-magnet synchronous motor based on a loss model algorithm is Formula (4):

$$P_{loss} = P_{cu} + P_{Fe} \quad (4)$$

where, $P_{cu} = R(i_d^2 + i_q^2)$, $P_{Fe} = R(i_{rd}^2 + i_{rq}^2)$.

Therefore, from Formula (4), Formula (5) can be derived:

$$P_{loss} = R\left[\left(i_{wd} - \frac{W_r L_q T_e}{n_p \psi_f R_{Fe}}\right)^2 + \left(\frac{T_e}{n_p \psi_f} + \frac{W_r(L_d i_{wd} + \psi_f)}{R_{Fe}}\right)^2\right] + \frac{W_r^2}{R_{Fe}}\left[\frac{T_e^2 L_q^2}{n_p^2 \psi_f^2} + (L_d i_{wd} + \psi_f)^2\right]. \quad (5)$$

In the formula above, $U_d$ is a d-axis stator voltage in a d-q coordinate system, $U_q$ is a q-axis stator voltage in the d-q coordinate system, R is a stator winding resistance, $i_{wd}$ is an active component of a stator current on a d-axis, $i_{wq}$ is an active component of the stator current on a q-axis, $\psi_d$ is a d-axis stator flux linkage in the d-q coordinate system, $\psi_q$ is a q-axis stator flux linkage in the d-q coordinate system, and p is a differential operator. $U_{wd}$ is an active component of a stator voltage on the d-axis, $U_{wq}$ is an active component of the stator voltage on the q-axis, $R_{Fe}$ is an equivalent iron loss resistance, $i_d$ is a d-axis stator current in the d-q coordinate system, $i_q$ is a q-axis stator current in the d-q coordinate system, $i_{rd}$ is a reactive component of the stator current on the d-axis, $i_{rq}$ is a reactive component of the stator current on the q-axis, $P_{loss}$ is a loss power, $n_p$ is the number of pole pairs of the permanent-magnet synchronous motor, $T_e$ is an output torque, $W_r$ is an output rotation speed, $T_e$ and $W_r$ can approximate to constants under steady-state conditions, $L_q$ is a q-axis equivalent inductance, and $L_d$ is a d-axis equivalent inductance.

From Formula (5) for calculating the loss power of the permanent-magnet synchronous motor, the applicant finds that the loss power $P_{loss}$ is a function with respect to $i_{wd}$, $T_e$, and $W_r$; and $T_e$ and $W_r$ can approximate to constants under steady-state conditions. Therefore, $P_{loss}$ is dependent merely on $i_{wd}$, and this function is a concave function. Therefore, the question of finding the minimum loss power can be transformed into a question of discussing an extreme value. As can be seen from the properties of the concave function, there must be a $i_{wd}$ making the loss power reach a minimum value.

In addition, as can be seen from Formula (2), the loss power calculated by the above method depends on a plurality of parameters of the permanent-magnet synchronous motor. When the permanent-magnet synchronous motor is running, its parameters vary with temperature and frequency, and vary with perturbation factors. Therefore, an optimal d-axis current calculated through Formula (5) is inaccurate so that the efficiency of the permanent magnet synchronous motor fails to be optimal.

In view of the above problems, an embodiment of this application provides a method for optimizing efficiency of a permanent magnet synchronous motor. The method reconstructs a calculation method of the loss power of the permanent-magnet synchronous motor, uses the calculation method to calculate the loss power, and uses the loss power as an input into a tracking differentiator so that the tracking differentiator outputs a target d-axis current. A duty ratio is determined based on the output target d-axis current and a preset q-axis current, and the duty ratio is fed into an inverter to drive the permanent-magnet synchronous motor to operate. When the permanent-magnet synchronous motor is driven by the target d-axis current, the loss power can reach a minimum value, so that the efficiency of the permanent-magnet synchronous motor is optimal.

The following describes technical solutions in embodiments of this application with reference to the drawings in the embodiments of this application.

Figure 2:
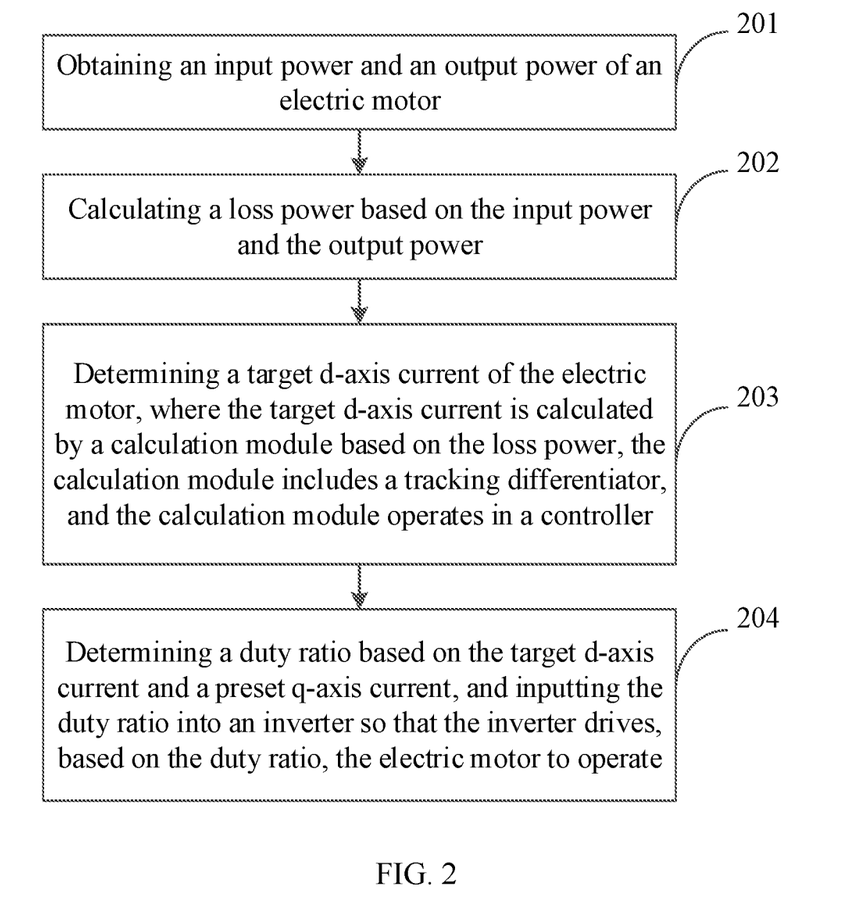
FIG. 2 is a schematic flowchart of a permanent-magnet synchronous motor control method according to an embodiment of this application.

FIG. 2 is a schematic flowchart of a permanent-magnet synchronous motor control method according to an embodiment of this application. As shown in FIG. 2, this method is implemented by a controller. The controller is connected to the permanent-magnet synchronous motor and an inverter. The controller may be a DSP chip or another component capable of implementing the following method or the like. The method includes the following steps.

Step 201: Obtaining an input power and an output power of an electric motor. The controller is connected to the permanent-magnet synchronous motor, and can collect relevant parameters of the permanent-magnet synchronous motor in operation, so as to obtain the input power and output power of the permanent-magnet synchronous motor.

Step 202: Calculating a loss power based on the input power and the output power.

Step 203: Determining a target d-axis current of the electric motor. The target d-axis current is calculated by a calculation module based on the loss power. The calculation module includes a tracking differentiator. The calculation module operates in the controller. The tracking differentiator may be formed of a first-order inertial element, or formed of a calculus of differences, or formed of a second-order transfer function. The loss power is input as a feedback signal into the tracking differentiator. The tracking differentiator tracks the input loss power and outputs a target d-axis current. Understandably, the target d-axis current can minimize the loss power of the permanent-magnet synchronous motor. In addition, the calculation module may include other algorithms in addition to the tracking differentiator.

Step 204: Determining a duty ratio based on the target d-axis current and a preset q-axis current, and inputting the duty ratio into an inverter so that the inverter drives, based on the duty ratio, the electric motor to operate. The inverter is connected to the permanent-magnet synchronous motor. After obtaining the target d-axis current, the controller calculates a duty ratio based on the target d-axis current and the q-axis current, and inputs the duty ratio into the inverter. Based on the duty ratio, the inverter drives the permanent-magnet synchronous motor to operate. Understandably, the preset q-axis current is determined by a PI controller based on a given rotation speed and an actual rotation speed of the permanent-magnet synchronous motor. The PI controller is a part of the controller.

This embodiment of this application reconstructs a loss power estimation equation based on the difference between the input power and the output power. Then the loss power is fed as a feedback signal into the tracking differentiator. The tracking differentiator implements fast tracking of the loss power and outputs an approximate differentiation signal, that is, the target d-axis current, thereby controlling the minimum loss power. By this control method, the dependence of the electric motor on the parameters thereof is reduced greatly, the robustness of the system is improved, and the precision of the loss is further improved.

On the basis of the above embodiment, the obtaining an input power and an output power of an electric motor includes:

obtaining an input voltage and an input current of the electric motor, and obtaining the input power based on the input voltage and the input current; and obtaining an output torque and an output rotation speed of the electric motor, and obtaining the output power based on the output torque and the output rotation speed.

In a specific implementation process, the input power is a product of the voltage and current input into the permanent-magnet synchronous motor, as shown in Formula (6); and the output power is calculated based on the output torque and rotation speed of the permanent-magnet synchronous motor, as shown in Formula (7):

$$P_{in}=UI \quad (6); \text{ and}$$

$$P_{out}=T_e W_r \quad (7)$$

In the formula above, $P_{in}$ is the input power, U is the input voltage, I is the input current, $P_{out}$ is the output power, $T_e$ is the output torque, and $W_r$ is the output rotation speed.

In this embodiment of this application, the input power and the output power are calculated, and then a loss power is calculated based on the input power and the output power, thereby obtaining an accurate loss power on the one hand and reducing the dependence on internal parameters of the electric motor on the other hand.

On the basis of the above embodiment, the calculating a loss power based on the input power and the output power includes:

using a difference between the output power and the input power as the loss power.

In a specific implementation process, after calculating the input power and the output power, the controller calculates the difference between the input power and the output power to obtain the loss power.

Figure 3:
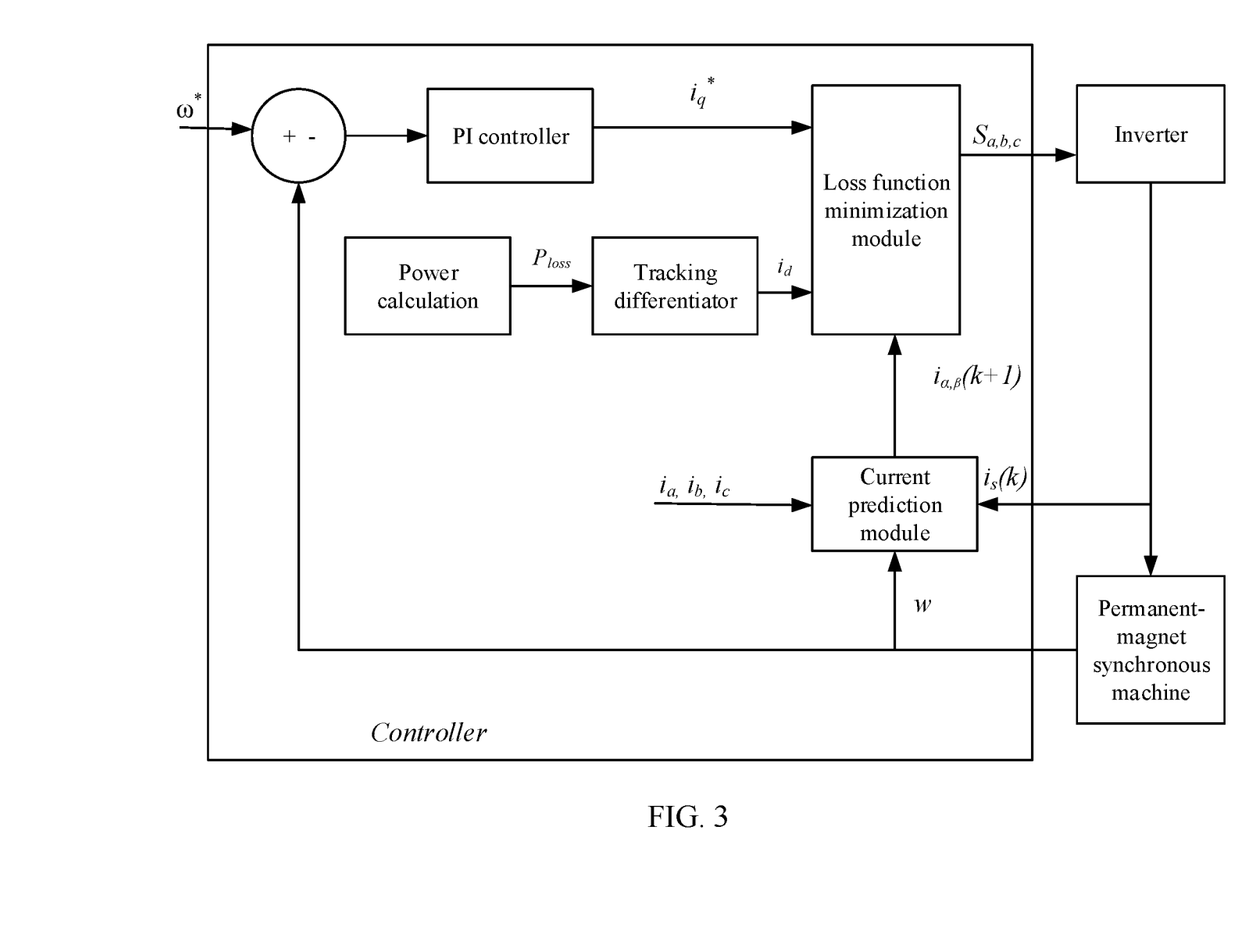
FIG. 3 is a schematic diagram of closed-loop adaptive control of a permanent-magnet synchronous motor according to an embodiment of this application.

In this embodiment of this application, the difference between the input power and the output power is calculated to obtain the loss power, thereby obtaining an accurate loss power on the one hand and reducing the dependence on internal parameters of the electric motor on the other hand. FIG. 3 is a schematic diagram of closed-loop adaptive control of a permanent-magnet synchronous motor according to an embodiment of this application. As shown in FIG. 3, $P_{loss}$ is the loss power, $\omega^*$ is a given rotation speed, $i_q^*$ is the preset q-axis current, and may be output by a PI controller by regulating, $i_d$ is the target d-axis current, $S_{a,b,c}$ is the duty ratio, $i_a$, $i_b$, and $i_c$ each are a sampled three-phase current, $i_{\alpha,\beta}(k+1)$ is a current at a (k+1)th moment in a $\alpha\beta$ coordinate system, $i_s(k)$ is a stator current at a kth moment, and w is an actual rotation speed of the permanent-magnet synchronous motor. The controller is configured to calculate the loss power and output the target d-axis current, and feed the obtained target d-axis current and the q-axis current into a minimum-loss function module. The minimum-loss function module outputs $S_{a,b,c}$, and controls on/off time of the inverter based on the output duty ratio $S_{a,b,c}$, so that the inverter drives the electric motor to output a target current, thereby ultimately controlling the minimum loss power.

It needs to be noted that the schematic control diagram illustrated in FIG. 3 is merely an example. In practical applications, there may be other variations. For example, the PI controller in FIG. 3 may be removed, and the preset q-axis current may be preset manually.

In another embodiment, the determining a duty ratio based on the target d-axis current and a preset q-axis current includes:

comparing the target d-axis current with a current d-axis current in the inverter, and comparing the preset q-axis current with a current q-axis current in the inverter, and determining the duty ratio based on the target d-axis current and the preset q-axis current if a deviation between the target d-axis current and the current d-axis current is greater than a first preset threshold and/or a deviation between the preset q-axis current and the current q-axis current is greater than a second preset threshold.

In a specific implementation process, the current d-axis current in the inverter means a d-axis current used for the inverter to drive the permanent magnet synchronous motor to operate before the target d-axis current is input into the inverter, and may also be understood as a target d-axis current previously output by the controller. After obtaining the target d-axis current, the controller compares the target d-axis current with a current d-axis current. If a deviation between the target d-axis current and the current d-axis current is greater than a first preset threshold, it indicates that the d-axis current required for the permanent-magnet synchronous motor to achieve a minimum loss power has changed greatly than a previous moment, and therefore, the duty ratio needs to be recalculated. Similarly, if a deviation between the preset q-axis current and a current q-axis current that is currently used by the inverter is greater than a second preset threshold, it indicates that the q-axis current required for the permanent-magnet synchronous motor to achieve a minimum loss power has changed greatly against the previous moment, and therefore, the duty ratio needs to be recalculated. The duty ratio is calculated based on the target d-axis current and the preset q-axis current. After the duty ratio is obtained, the duty ratio is input into the inverter, and the inverter drives, based on the duty ratio, the permanent-magnet synchronous motor to operate. If the deviation between the target d-axis current and the current d-axis current is not greater than the first preset threshold, and the deviation between the preset q-axis current and the current q-axis current is not greater than the second preset threshold, it indicates that the d-axis current and q-axis current required for the permanent-magnet synchronous motor to achieve the minimum loss power have little changed than the previous moment. The current d-axis current and the current q-axis current can still be used to drive the permanent-magnet synchronous motor to approximately minimize the loss power. Understandably, the first preset threshold and the second preset threshold may be set as actually required, without being specifically limited in this embodiment of this application.

In this embodiment of this application, the target d-axis current is compared with the current d-axis current, and the preset q-axis current is compared with the current q-axis current. When the deviation between the target d-axis current and the current d-axis current is small, and the deviation between the preset q-axis current and the current q-axis current is also small, the duty ratio is not recalculated, thereby reducing the amount of computing.

On the basis of the above embodiment, the method further includes:

constructing the tracking differentiator based on a second-order transfer function, where the tracking differentiator includes one input end and two output ends, a first output end is configured to track dynamic characteristics of the input loss power, and a second output end is configured to differentiate a signal output by the first output end.

Figure 4:
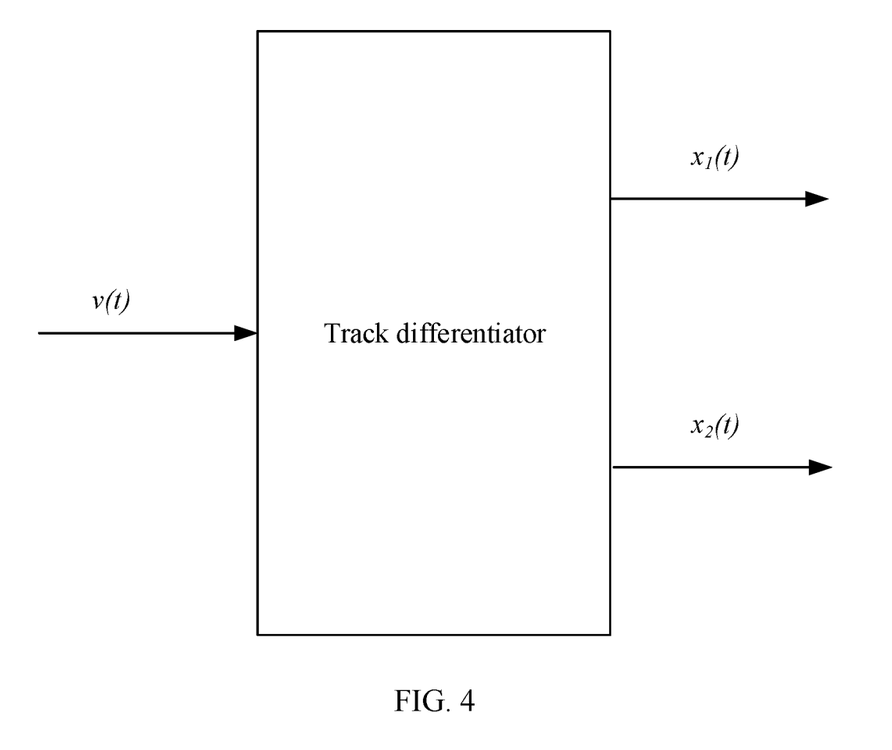
FIG. 4 is a schematic diagram of a tracking differentiator according to an embodiment of this application.

In a specific implementation process, the tracking differentiator according to this embodiment of this application is constructed by using a second-order transfer function. FIG. 4 is a schematic diagram of a tracking differentiator according to an embodiment of this application. As shown in FIG. 4, the tracking differentiator includes an input end and two output ends. The input end inputs the loss power v(t) of the permanent-magnet synchronous motor. The first output end outputs $x_1(t)$, and the second output end outputs $x_2(t)$. $x_1(t)$ tracks dynamic characteristics of v(t), and $x_2$(t) differentiates $x_1$(t) to obtain a reference value of the target d-axis current.

On the basis of the above embodiment, the second-order transfer function may be expressed as:

$$W_s = \frac{r^2}{s^2 + 2rs + r^2}.$$

The tracking differentiator constructed by using the second-order transfer function according to this embodiment of this application may be represented by Formula (8):

$$\begin{cases} x_1(k+1) = x_1(k) + hx_2(k) \\ x_2(k+1) = x_2(k) + h(-r^2(x_1(k) - v_0(k)) - 2rx_2(k) \end{cases} \quad (8)$$

In the formula above, $v_0$(k) is an input to the tracking differentiator, and is a loss power corresponding to a kth moment; $x_1$(k+1) is a first output from the tracking differentiator at a (k+1)th moment, and is used to track dynamic characteristics of the loss power at the kth moment; $x_2$(k+1) is a second output from the tracking differentiator at a (k+1)th moment, and is used to differentiate the first output; h is a speed factor, and affects filter performance; and r is a filter factor, and decides the speed for the tracking differentiator to track the input signal. Both h and r need to be preset manually.

In this embodiment of this application, the loss power of the permanent-magnet synchronous motor is input into the tracking differentiator, so that the tracking differentiator can obtain the target d-axis current quickly. Without a need to know a precise model of the controlled object, the tracking differentiator can not only track the input signal as soon as practicable, but also give an approximate differential signal, thereby exhibiting excellent anti-perturbation capabilities and dynamic characteristics.

Figure 5:
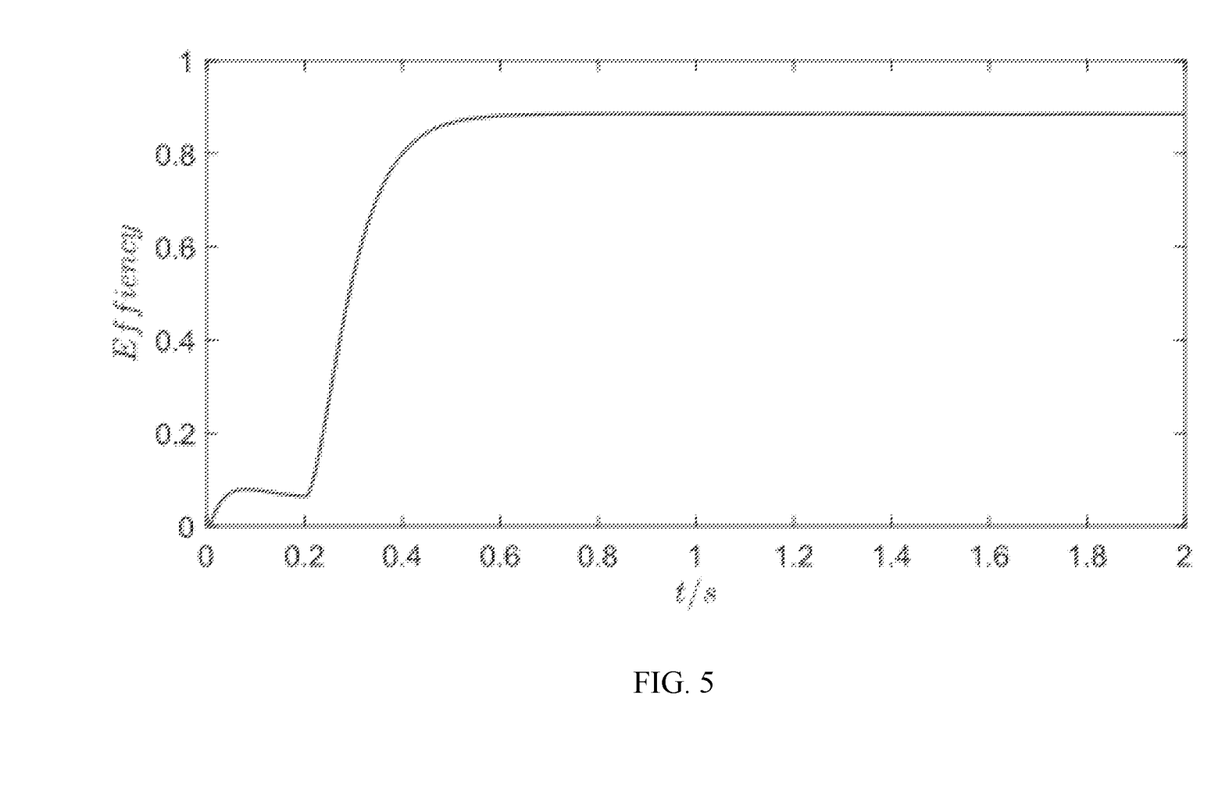
FIG. 5 is an efficiency optimization effect drawing according to an embodiment of this application.

FIG. 5 is an efficiency optimization effect drawing according to an embodiment of this application. As can be seen from FIG. 5, the efficiency of the permanent-magnet synchronous motor reaches nearly 90% in approximate 0.5 second, and the optimization speed is very fast.

Figure 6:
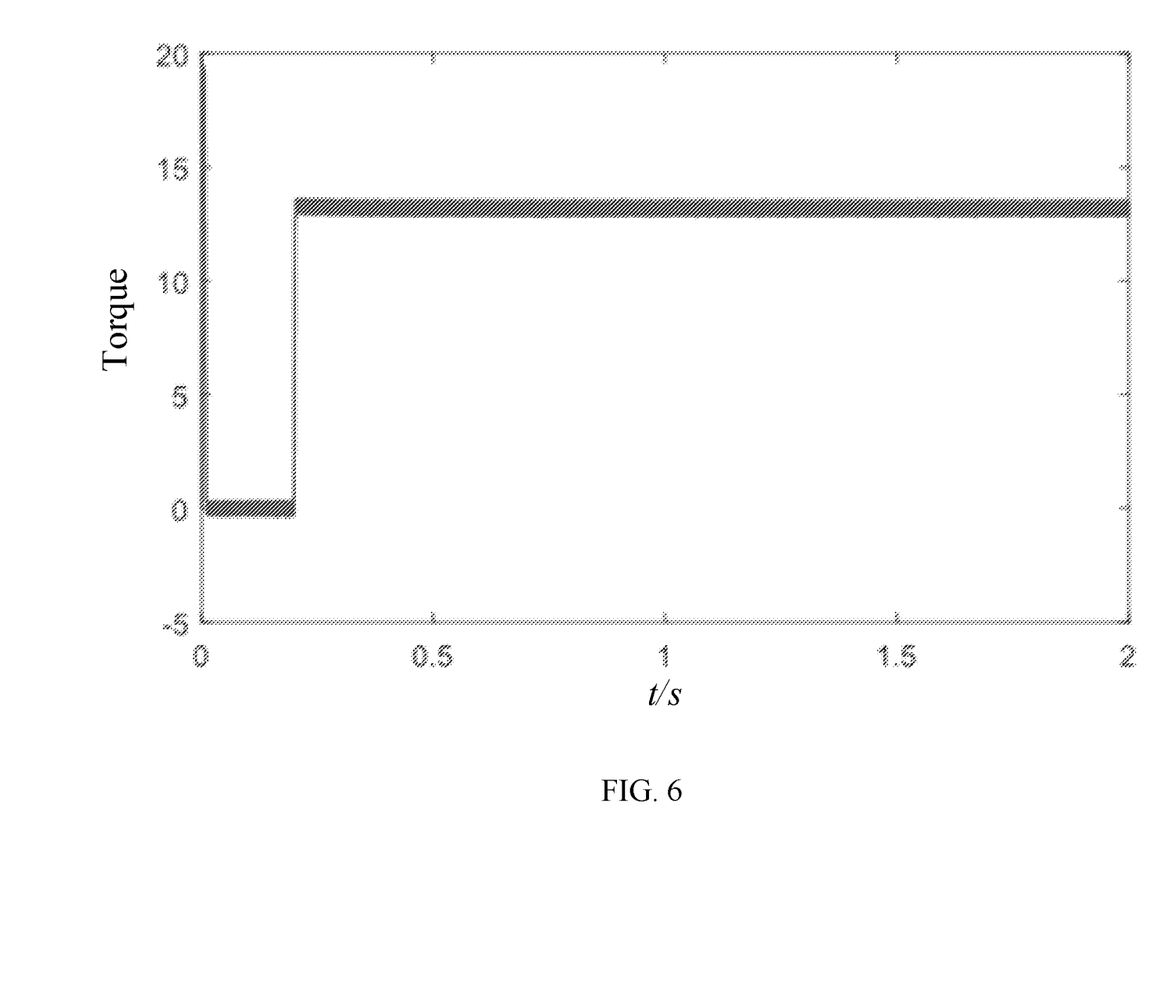
FIG. 6 is a schematic diagram of an output torque after optimization according to an embodiment of this application.

FIG. 6 is a schematic diagram of an output torque after optimization according to an embodiment of this application. This embodiment of this application mainly solves the problem that the conventional loss model depends on the parameters of the electric motor and the problem that the loss power evaluation function is inaccurate. Therefore, as can be seen from FIG. 6, the output torque reaches a high level in a short time. The electric motor control method according to this embodiment of this application improves robustness of a control device and the operating efficiency under different working conditions.

Figure 7:
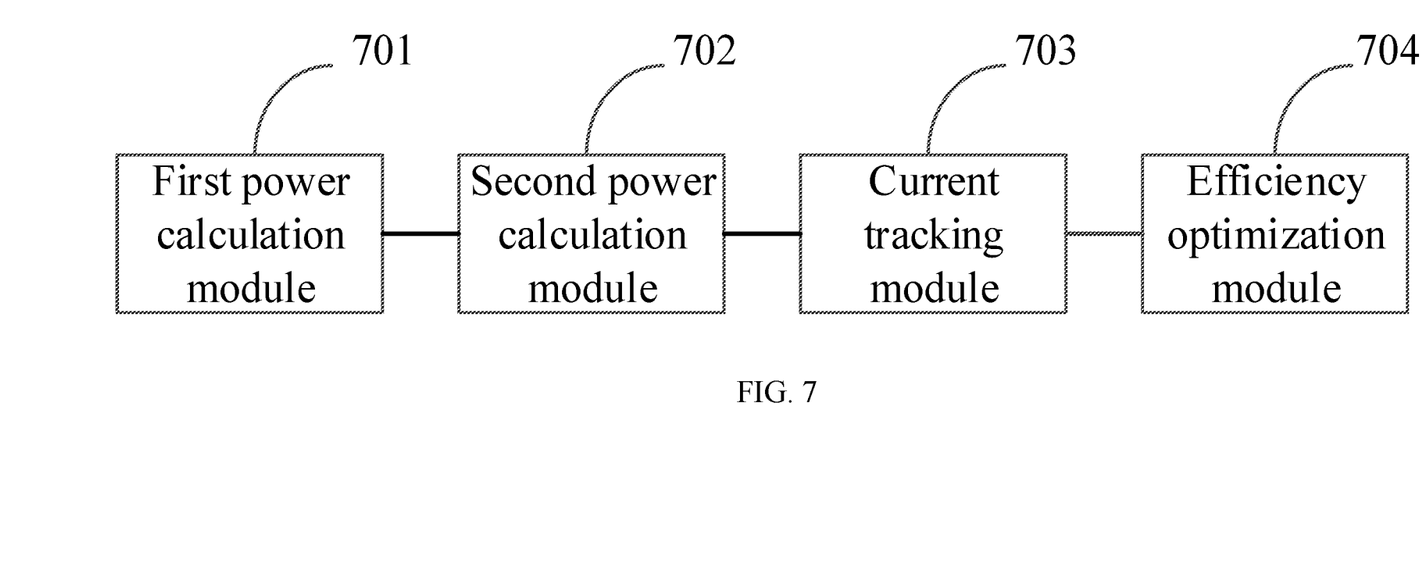
FIG. 7 is a schematic structural diagram of a permanent-magnet synchronous motor control device according to an embodiment of this application.

FIG. 7 is a schematic structural diagram of an electric motor control device according to an embodiment of this application. The device may be a module, a program segment, or code on an electronic device. Understandably, the device corresponds to the method embodiment shown in FIG. 2, and can implement the steps specified in the method embodiment shown in FIG. 2. Specific functions of the device may be learned by referring to the foregoing description, and the detailed description is duly omitted here to avoid repetition. The device includes: a first power calculation module 701, a second power calculation module 702, a current tracking module 703, and an efficiency optimization module 704.

The first power calculation module 701 is configured to obtain an input power and an output power of a permanent-magnet synchronous motor. The second power calculation module 702 is configured to determine a loss power based on the input power and the output power. The current tracking module 703 is configured to determine a target d-axis current of the electric motor, where the target d-axis current is calculated by a calculation module based on the loss power. The calculation module includes a tracking differentiator, and the calculation module operates in a controller. The efficiency optimization module 704 is configured to determine a duty ratio based on the target d-axis current and a preset q-axis current, and input the duty ratio into an inverter so that the inverter drives, based on the duty ratio, the electric motor to operate.

On the basis of the foregoing embodiment, the first power calculation module 701 is specifically configured to:

obtain an input voltage and an input current of the electric motor, and obtain the input power based on the input voltage and the input current; and obtain an output torque and an output rotation speed of the electric motor, and obtain the output power based on the output torque and the output rotation speed.

On the basis of the foregoing embodiment, the second power calculation module 702 is specifically configured to:

use a difference between the output power and the input power as the loss power.

On the basis of the foregoing embodiment, the efficiency optimization module 704 is specifically configured to:

compare the target d-axis current with a current d-axis current in the inverter, and compare the preset q-axis current with a current q-axis current in the inverter, and determine the duty ratio based on the target d-axis current and the preset q-axis current if a deviation between the target d-axis current and the current d-axis current is greater than a first preset threshold and/or a deviation between the preset q-axis current and the current q-axis current is greater than a second preset threshold.

On the basis of the foregoing embodiment, the tracking differentiator is constructed based on the second-order transfer function. The tracking differentiator includes one input end and two output ends. A first output end is configured to track dynamic characteristics of the input loss power, and a second output end is configured to differentiate a signal output by the first output end.

On the basis of the foregoing embodiment, the tracking differentiator is:

$$\begin{cases} x_1(k+1) = x_1(k) + hx_2(k) \\ x_2(k+1) = x_2(k) + h(-r^2(x_1(k) - v_0(k)) - 2rx_2(k)) \end{cases}.$$

In the formula above, $v_0$(k) is an input to the tracking differentiator, and is a loss power corresponding to a kth moment; $x_1$(k+1) is a first output from the tracking differentiator at a (k+1)th moment, and is used to track dynamic characteristics of the loss power at the kth moment; $x_2$(k+1) is a second output from the tracking differentiator at a (k+1)th moment, and is used to differentiate the first output; r is a speed factor; and h is a filter factor.

To sum up, this embodiment of this application mainly solves the problem that the conventional loss model depends on the parameters of the electric motor and the problem that the loss power evaluation function is inaccurate, and improves robustness of a drive system and the operating efficiency under different working conditions. A specific process is as follows. First, a relationship between the loss power and a stator current is derived by using an equivalent circuit of a loss model, and it is deduced that there must be an optimal d-axis current that minimizes the loss power, and then a loss power estimation equation is reconstructed based on the difference between the input power and the output power. Then the loss power is fed as a feedback signal into the tracking differentiator. The tracking differentiator implements fast tracking of the loss power and outputs an approximate differentiation signal, that is, the target d-axis current, thereby controlling the minimum loss power. By this control method, the dependence of the electric motor on the parameters thereof is reduced greatly, the robustness of the system is improved, and the precision of the loss is further improved.

In another embodiment, this application further provides an electric motor drive system. The electric motor drive system includes the control device according to each embodiment described above. Understandably, the electric motor drive system is applicable to an electric vehicle, an electric bicycle, an electric game vehicle, and the like, and also applicable to a soymilk machine, a cooking machine, and the like. The embodiments of this application do not specifically limit the application scenarios of the electric motor drive system.

In another embodiment, this application further provides an electric vehicle. The electric vehicle includes an electric motor drive system. Understandably, the electric vehicle may further include other components such as a power supply system and an auxiliary system. The power supply system includes a power supply, an energy management system, and a charger. Its main function is to provide electrical driving power to the electric motor, monitor the operating status of the power supply, and control the charger to charge a storage battery. The auxiliary system includes an auxiliary power source, a power steering system, a navigation system, an air conditioner, a lighting and defrosting device, a rain wiper, and a radio, and the like. The auxiliary system is mainly configured to improve maneuverability of the electric vehicle and the comfort of the passengers.

An embodiment of this application provides a computer program product. The computer program product includes a computer program stored in a non-transitory computer-readable storage medium. The computer program includes a program instruction. When the program instruction is executed by a computer, the computer can perform the method according to any of the foregoing method embodiments. For example, the method includes: obtaining an input power and an output power of an electric motor; calculating a loss power based on the input power and the output power; determining a target d-axis current of the electric motor, where the target d-axis current is calculated by a calculation module based on the loss power, the calculation module includes a tracking differentiator, and the calculation module operates in a controller; and determining a duty ratio based on the target d-axis current and a preset q-axis current, and inputting the duty ratio into an inverter so that the inverter drives, based on the duty ratio, the electric motor to operate.

An embodiment of this application provides a non-transitory computer-readable storage medium. The non-transitory computer-readable storage medium stores a computer instruction. The computer instruction causes a computer to perform the method according to any of the foregoing method embodiments. For example, the method includes: obtaining an input power and an output power of an electric motor; calculating a loss power based on the input power and the output power; determining a target d-axis current of the electric motor, where the target d-axis current is calculated by a calculation module based on the loss power, the calculation module includes a tracking differentiator, and the calculation module operates in a controller; and determining a duty ratio based on the target d-axis current and a preset q-axis current, and inputting the duty ratio into an inverter so that the inverter drives, based on the duty ratio, the electric motor to operate.

In the embodiments provided in this application, it is understandable that the disclosed device and method may be implemented by other means. The device embodiment described above is merely exemplary. For example, the unit division is merely division with respect to logical functions, and in actual implementations, the units may be divided in other manners. For another example, a plurality of units or components may be combined or integrated into another system, or some features may be ignored or not implemented. In addition, the displayed or discussed mutual couplings or direct couplings or communications connections may be implemented through some communications interfaces. The indirect couplings or communications connections between the devices or units may be implemented in electronic, mechanical or other forms.

In addition, the units described as discrete components above may be separated physically or not; and the components illustrated as units may be physical units or not, that is, they may be located in one place or distributed on a plurality of network elements. Some or all of the units may be selected according to actual needs to achieve the objectives of the solutions of the embodiments.

In addition, function modules in each embodiment of this application may be integrated together to form a stand-alone part, or each module may exist alone, or two or more modules may be integrated into a stand-alone part.

The relational terms herein such as first and second are used merely to differentiate one entity or operation from another, and do not necessarily require or imply any actual relationship or sequence between the entities or operations.

What is described above is merely embodiments of this application, but not intended to limit the protection scope of this application. To a person skilled in the art, various modifications and variations may be made to this application. Any modifications, equivalent replacements, improvements, and the like made without departing from the spirit and principles of this application fall within the protection scope of this application.

What is claimed is:

1. An electric motor control method performed by a controller, the method comprising:
    obtaining an input power and an output power of an electric motor;
    determining a loss power based on the input power and the output power;
    determining a target d-axis current of the electric motor, wherein the target d-axis current is calculated by a calculation module based on the loss power, the calculation module comprises a tracking differentiator, and the calculation module operates in the controller; and
    determining a duty ratio based on the target d-axis current and a preset q-axis current, and inputting the duty ratio into an inverter so that the inverter drives, based on the duty ratio, the electric motor to operate.

2. The method according to claim 1, wherein the obtaining an input power and an output power of an electric motor comprises:

obtaining an input voltage and an input current of the electric motor, and obtaining the input power based on the input voltage and the input current; and obtaining an output torque and an output rotation speed of the electric motor, and obtaining the output power based on the output torque and the output rotation speed.

3. The method according to claim 1, wherein the calculating a loss power based on the input power and the output power comprises:

using a difference between the output power and the input power as the loss power.

4. The method according to claim 1, wherein the determining a duty ratio based on the target d-axis current and a preset q-axis current comprises:

comparing the target d-axis current with a current d-axis current in the inverter, comparing the preset q-axis current with a current q-axis current in the inverter, and determining the duty ratio based on the target d-axis current and the preset q-axis current if a deviation between the target d-axis current and the current d-axis current is greater than a first preset threshold and/or a deviation between the preset q-axis current and the current q-axis current is greater than a second preset threshold.

5. The method according to claim 1, wherein the tracking differentiator is constructed based on a second-order transfer function, wherein the tracking differentiator comprises one input end and two output ends, a first output end is configured to track dynamic characteristics of the input loss power, and a second output end is configured to differentiate a signal output by the first output end.

6. The method according to claim 5, wherein the tracking differentiator is:

$$\begin{cases} x_1(k+1) = x_1(k) + hx_2(k) \\ x_2(k+1) = x_2(k) + h(-r^2(x_1(k) - v_0(k) - 2rx_2(k)) \end{cases},$$

wherein, $v_0(k)$ is an input to the tracking differentiator, and is a loss power corresponding to a kth moment; $x_1(k+1)$ is a first output from the tracking differentiator at a $(k+1)^{th}$ moment, and is used to track dynamic characteristics of the loss power at the kth moment; $x_2(k+1)$ is a second output from the tracking differentiator at a $(k+1)^{th}$ moment, and is used to differentiate the first output; r is a speed factor; and h is a filter factor.

7. An electric motor control device, comprising:
a first power calculation module, configured to obtain an input power and an output power of an electric motor;
a second power calculation module, configured to determine a loss power based on the input power and the output power;
a current tracking module, configured to determine a target d-axis current of the electric motor, wherein the target d-axis current is calculated by a calculation module based on the loss power, the calculation module comprises a tracking differentiator, and the calculation module operates in the control device; and
an efficiency optimization module, configured to determine a duty ratio based on the target d-axis current and a preset q-axis current, and input the duty ratio into an inverter so that the inverter drives, based on the duty ratio, the electric motor to operate.

8. An electric motor drive system, wherein the drive system comprises the electric motor control device according to claim 7.

9. An electric vehicle, wherein the electric vehicle comprises the electric motor drive system according to claim 8.

10. A non-transitory computer-readable storage medium storing a computer-executable instruction that, when executed by a computer, causes an electric motor control device to perform an electric motor control method, the method comprising:

obtaining an input power and an output power of an electric motor;

determining a loss power based on the input power and the output power;

determining a target d-axis current of the electric motor, wherein the target d-axis current is calculated by a calculation module based on the loss power, the calculation module comprises a tracking differentiator, and the calculation module operates in the control device; and determining a duty ratio based on the target d-axis current and a preset q-axis current, and inputting the duty ratio into an inverter so that the inverter drives, based on the duty ratio, the electric motor to operate.

11. The non-transitory computer-readable storage medium according to claim 10, wherein the obtaining an input power and an output power of an electric motor comprises:

obtaining an input voltage and an input current of the electric motor, and obtaining the input power based on the input voltage and the input current; and obtaining an output torque and an output rotation speed of the electric motor, and obtaining the output power based on the output torque and the output rotation speed.

12. The non-transitory computer-readable storage medium according to claim 10, wherein the calculating a loss power based on the input power and the output power comprises:

using a difference between the output power and the input power as the loss power.

13. The non-transitory computer-readable storage medium according to claim 10, wherein the determining a duty ratio based on the target d-axis current and a preset q-axis current comprises:

comparing the target d-axis current with a current d-axis current in the inverter, comparing the preset q-axis current with a current q-axis current in the inverter, and determining the duty ratio based on the target d-axis current and the preset q-axis current if a deviation between the target d-axis current and the current d-axis current is greater than a first preset threshold and/or a deviation between the preset q-axis current and the current q-axis current is greater than a second preset threshold.

14. The non-transitory computer-readable storage medium according to claim 10, wherein the tracking differentiator is constructed based on a second-order transfer function, wherein the tracking differentiator comprises one input end and two output ends, a first output end is configured to track dynamic characteristics of the input loss power, and a second output end is configured to differentiate a signal output by the first output end.

15. The non-transitory computer-readable storage medium according to claim 14, wherein the tracking differentiator is:

$$\begin{cases} x_1(k+1) = x_1(k) + hx_2(k) \\ x_2(k+1) = x_2(k) + h(-r^2(x_1(k) - v_0(k) - 2rx_2(k)) \end{cases},$$

wherein, $v_0(k)$ is an input to the tracking differentiator, and is a loss power corresponding to a $k^{th}$ moment; $x_1(k+1)$ is a first output from the tracking differentiator at a $(k+1)^{th}$ moment, and is used to track dynamic characteristics of the loss power at the $k^{th}$ moment; $x_2(k+1)$ is a second output from the tracking differentiator at a $(k+1)^{th}$ moment, and is used to differentiate the first output; r is a speed factor; and h is a filter factor.

* * * * *